April 20, 1937.  M. H. BENNETT  2,077,869
HOSE COUPLING
Filed Dec. 16, 1935
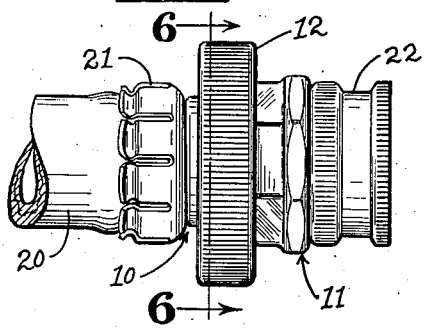
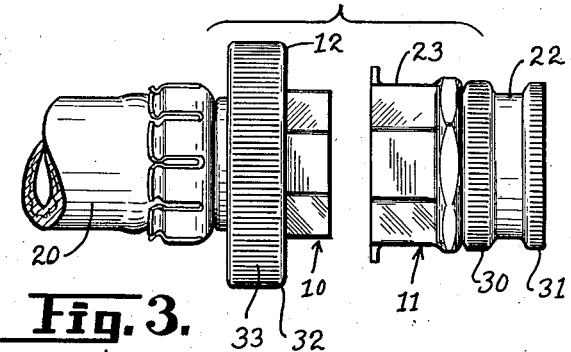
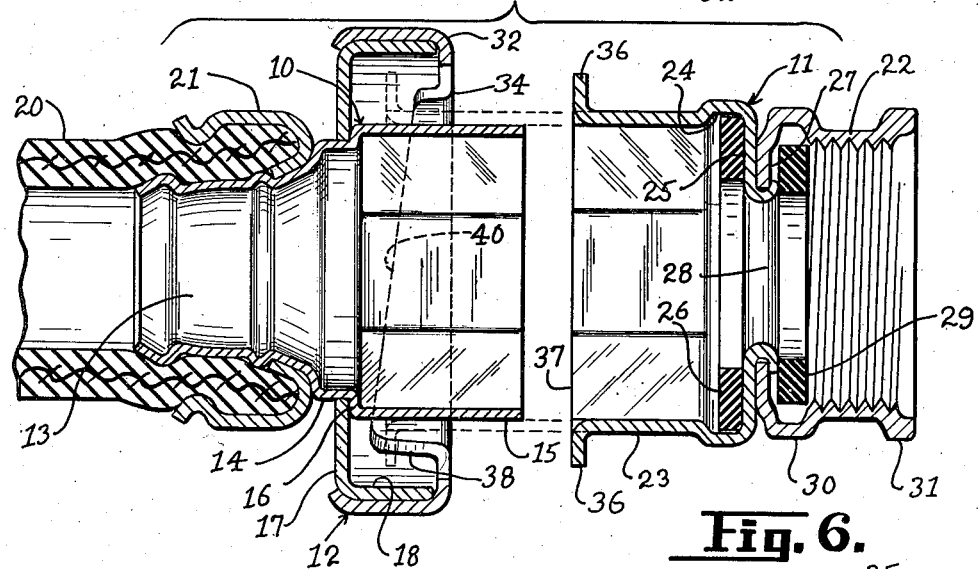
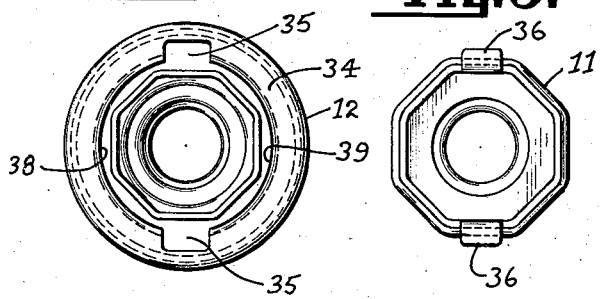
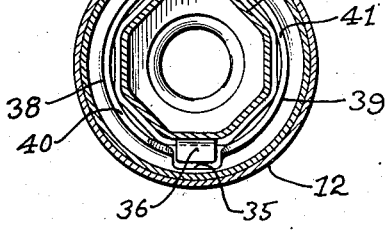
INVENTOR
Morris H. Bennett.
Deceased
John J. Monzani, Admr.
By H. G. Manning
ATTORNEY Patented Apr. 20, 1937

2,077,869

UNITED STATES PATENT OFFICE 2,077,869

HOSE COUPLING

Morris H. Bennett, deceased, late of Prospect, Conn., by John T. Monzani, administrator, Waterbury, Conn., assignor to Scovill Manufacturing Company, Waterbury, Conn., a corporation of Connecticut Application December 16, 1935, Serial No. 54,631

1 Claim. (Cl. 285—177)

This invention relates to hose couplings, and more particularly to a two-part coupling, the sections of which may be quickly and easily coupled and uncoupled.

One object of this invention is to provide a hose coupling of the above nature in which both sections are constructed of inexpensive metal shells instead of from expensive forgings or castings.

A further object is to provide a hose coupling of the above nature which comprises a pair of telescoping male and female members having polygonal interfitting sections to prevent relative rotation of one member with respect to the other, one member including a swiveling locking cam sleeve for engaging with cooperating lugs on the other member, whereby said members may be locked securely together in liquid-tight connection.

A further object is to provide a hose coupling of the above nature which will be simple in construction, inexpensive to manufacture, easy to assemble and manipulate, compact, ornamental in appearance, and very efficient and durable in use.

With these and other objects in view there has been illustrated on the accompanying drawing one form in which the invention may be conveniently embodied in practice.

In the drawing:

Fig. 1 represents a side view of the hose coupling as it appears with the parts assembled.

Fig. 2 is a similar view with the coupling members in detached position.

Fig. 3 is an enlarged vertical longitudinal sectional view of the coupling members, as shown in Fig. 2.

Fig. 4 is an end view of the male coupling member.

Fig. 5 is an end view of the female coupling member.

Fig. 6 is a transverse sectional view of the coupling, taken along the line 6—6 of Fig. 1, looking in the direction of the arrows, and showing the relative position of the male and female members before the cam sleeve is rotated into locked position.

Referring now to the drawing in which like reference numerals denote corresponding parts throughout the several views, the numerals 10 and 11 indicate respectively a pair of cooperating tubular male and female coupling members which may readily be coupled and uncoupled by manipulating a swiveled cam sleeve 12 in a manner to be later described.

The male member 10 comprises a reduced tapering hose engaging section 13, an intermediate cylindrical section 14 upon which the cam sleeve 12 is journaled, and a forward enlarged octagonal collar 15. Between the octagonal section 15 and the intermediate cylindrical section 14 a shoulder 16 is formed which engages the inturned base 17 of an annular cup 18 of the swiveled cam sleeve 12.

The section 13 of the male coupling member 10 is adapted to be forcibly inserted into the end of the rubber hose 20, and is provided with a plurality of surrounding hose engaging clincher teeth 21 which are adapted to be pounded inwardly and embedded within the exterior surface of the rubber covered hose 20 so as to assure a permanent and liquid-tight connection between the male member 10 and the hose 20.

The tubular female member 11 includes a rear interiorly threaded attachment socket 22 and a forward octagonal collar 23 shaped to fit loosely over the collar 15 of the male coupling member 10. The rear end of the female collar 23 is provided with an enlarged grooved octagonal section 24 adjoining which is a transverse annular shoulder 25, upon which a flat octagonal rubber washer 26 is adapted to seat. The rubber washer 26 is preferably made of such a diameter as to fit snugly in the enlarged grooved section 24, whereby it will be prevented from falling out when the male coupling member is not in assembled position.

The end of the attachment socket 22 adjacent the base of the female collar 23 is provided with an inturned annular shoulder or ledge 27 which abuts flat against the annular shoulder 25 and is held rigidly in position with respect thereto by spinning the inner rim 28 of said shoulder 25 outwardly around the inner edge of the annular ledge 27. A flat rubber washer 29 is disposed in the base of the attachment socket 22, and is adapted to seat upon the ledge 27 and rim 28 to produce a liquid-tight seal between said body 22 and a threaded faucet or other source of liquid supply to which it may be attached. The exterior surface of the socket 22 is preferably formed with a pair of spaced knurled finger gripping ribs 30 and 31 to facilitate the manipulation thereof.

The cam sleeve 12 is provided with an exterior annular cup 32, preferably knurled at 33 and embracing the outside of the cup 18 to effect a permanent and rigid connection therebetween.

The exterior cup 32 is formed with an inwardly directed annular flange 34, from which extend a pair of diametrically opposed arcuate cam segments 38, 39, between which are slots 35 through which a pair of outwardly extending radial tongues or locking lugs 36 integral with the transverse front edge 37 of the female collar 23 are adapted to pass. The cam segments 38, 39 are spaced from the exterior of the octagonal shell 10 and terminate in a pair of inclined locking cam edges 40 and 41.

Operation

In operation, the socket 22 will preferably first be connected to the threaded spout of a faucet or other source of liquid supply, not shown. The octagonal collar 15 of the male coupling member 10 will then be alined with the octagonal collar 23 of the female coupling member 11, and the cam sleeve 12 manually rotated until the slots 35 are brought into alinement with the locking lugs 36. The male coupling member 11 will next be inserted longitudinally into the female coupling member 10 as far as it will go, and the inner end of the male collar 15 will then abut against the rubber washer 26.

Finally, to complete the assembly, the cam sleeve 12 will be manually turned in a clockwise direction, as viewed in Fig. 6, to cause the locking lugs 36 of the female coupling member 11 to ride over the inclined edges 40 and 41 of the cam skirts 38 and 39. This action will embed the end of the male collar 15 tightly in the rubber washer 26 and effect a liquid-tight seal between the coupling members.

To detach the coupling members, the operation is the reverse of that just described, it being only necessary to rotate the cam sleeve 12 in a counterclockwise direction as far as it will go, whereupon the coupling members 10 and 11 may be easily pulled apart.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a detachable hose coupling, the parts of which are formed from sheet material, a pair of telescoping shell members having mating polygonal parts for non-rotative liquid-tight connection with each other, the outer of said shell members having a pair of outstanding lugs, the inner of said members carrying a swiveled sleeve with inwardly extending cams for engaging said lugs to lock said shell members in assembled position, said cam sleeve comprising a pair of interfitted annular cups, one of said cups being journaled on a cylindrical section of said inner shell member, and the other annular cup having its inner edge provided with a pair of arcuate lug-engaging cam segments spaced from the exterior surface of said inner shell member.

JOHN T. MONZANI,
*Administrator of Morris H. Bennett, Deceased.*